(12) United States Patent
Knowles et al.

(10) Patent No.: US 7,559,245 B2
(45) Date of Patent: Jul. 14, 2009

(54) VACUUM GAUGE AND REFRIGERATION SYSTEM SERVICE TOOL, AND METHODS OF USING THE SAME

(75) Inventors: Steven M. Knowles, North Manchester, IN (US); Paul Appler, Windsor (CA); Jack Brass, Toronto (CA)

(73) Assignee: Brasscorp Limited, New York, ON (CA)

( * ) Notice: Subject to any disclaimer, the term of this patent is extended or adjusted under 35 U.S.C. 154(b) by 0 days.

(21) Appl. No.: 11/905,391

(22) Filed: Sep. 28, 2007

(65) Prior Publication Data

US 2008/0190208 A1    Aug. 14, 2008

Related U.S. Application Data

(60) Provisional application No. 60/848,353, filed on Sep. 29, 2006.

(51) Int. Cl.
*G01L 7/00* (2006.01)
(52) U.S. Cl. .............................. 73/714; 73/700; 73/732; 73/741
(58) Field of Classification Search ........... 73/700–756; 361/283.1–283.4
See application file for complete search history.

(56) References Cited

U.S. PATENT DOCUMENTS

| | | | |
|---|---|---|---|
| 2,517,870 A | 8/1950 | Gump | |
| 3,935,713 A | 2/1976 | Olson | |
| 4,305,193 A | 12/1981 | Anderson | |
| 4,550,481 A | 11/1985 | Preston | |
| 4,563,803 A | 1/1986 | Dimoff | |
| 4,597,147 A | 7/1986 | Henry | |
| 4,599,776 A | 7/1986 | Haggard et al. | |
| 4,706,357 A | 11/1987 | Ewing | |
| 4,770,044 A * | 9/1988 | Ferris | 73/744 |
| 4,829,829 A * | 5/1989 | Ferris | 73/744 |
| 5,228,178 A | 7/1993 | Stickley | |
| 5,472,011 A | 12/1995 | St. Marie | |
| 5,842,260 A | 12/1998 | Todd, III et al. | |
| 5,915,740 A | 6/1999 | Weitner | |
| 6,253,436 B1 | 7/2001 | Barjesteh et al. | |
| 6,837,064 B2 | 1/2005 | Knowles | |
| 7,096,685 B2 | 8/2006 | Knowles | |

* cited by examiner

Primary Examiner—Andre J Allen
Assistant Examiner—Jermaine Jenkins

(57) ABSTRACT

A vacuum gauge has a scale having a safe zone indicia, a working zone indicia, an indicator to indicate a particular location on the scale, and a pressure sensing mechanism and housing having a pressure sensing port accessible for fluid connection to the refrigeration system to receive fluid for sensing. The indicia are distinctly coded for user differentiation. The scale may include a leak indicating zone indicia and a non-working zone indicia The safe zone indicia may represent 0 to 500 microns, the working zone indicia 500 to 2000 microns, the leak indicating zone indicia 2000 to 25,400 microns, and the non-working zone indicia 25,400 to 30,000 microns. Service tool combination includes body assembly, shaft assembly and gauge in direct sealed connection with a fitting for releasable sealed fluid connection. There are methods using the combination. Tool has gripper with cavity to receive valve core pin. Gripper has base to prevent pin from pulling gripper from tool.

18 Claims, 10 Drawing Sheets

VACUUM GAUGE AND REFRIGERATION SYSTEM SERVICE TOOL, AND METHODS OF USING THE SAME

The present application claims priority from, and the benefit of the filing date of, U.S. Application No. 60/848,353, filed on 29 Sep. 2006, the entire content of which is hereby incorporated by reference herein.

BACKGROUND

1. Field of the Invention

The invention relates to vacuum gauges and to refrigeration system (including air conditioning system) service tools. More particularly, the invention relates to vacuum gauges for use in services refrigeration systems.

2. Background of the Invention

Vacuum gauges are gauges used to sense pressures below atmospheric pressure. Such gauges were originally exclusively analog in form. A dial on the gauge face indicated the pressure of the system being serviced. More recently, vacuum gauges have been provided in a digital format. The numeric format of a digital vacuum gauge is easy to read; however, the numeric output of digital vacuum gauges tends to fluctuate fairly often, such that obtaining a reading can be frustrating for a service technician. This is particularly true where conditions in the field may be imperfect such that, for example, equipment may be dirty or lighting may be poor. Improvements to vacuum gauges, or alternatives to existing gauges, are desirable for efficient servicing of refrigeration systems.

When servicing a refrigeration system it is often desirable to remove a valve core from, or to insert a valve core into, a port of the system. Traditionally tools used for this purpose have been unreliable or cumbersome due to leaks or awkward connections. Improvements or alternatives to the way in which such tools are used or structured are desirable.

Thus, alternative or improved vacuum gauges, refrigeration system service tools, and methods of servicing refrigeration systems are desirable.

SUMMARY OF THE INVENTION

In a first aspect the invention provides a vacuum gauge for use in association with a refrigeration system. The gauge includes a scale having at least one pressure zone indicia selected from a group of zone indicia consisting of a safe zone indicia representing a range of pressure after which it is safe to charge the refrigeration system with refrigerant, and a working zone indicia representing a range of pressure within which water is being rapidly boiled off. It also includes an indicator to indicate a particular location on the scale. It further includes a pressure sensing mechanism and housing having a pressure sensing port accessible for fluid connection to the refrigeration system to receive fluid for sensing, the pressure sensing mechanism and housing sensing pressure at the pressure sensing port and causing the indicator to move in accordance with sensed pressure at the pressure sensing port.

The scale may include the working zone indicia and the safe zone indicia with the range of pressures represented by the working zone indicia and the safe zone indicia contiguous with one another, and the indicia distinctly coded for user differentiation.

The scale may include a leak indicating zone indicia representing a range of pressures contiguous with the working zone indicia pressures that is useful for detecting leaks, and the leak indicating indicia may be distinctly coded for user differentiation from the other indicia.

The scale may include a non-working zone indicia representing a range of pressures contiguous with the leak indicating zone indicia pressures wherein useful work is not occurring, and the non-working indicia may be distinctly coded for user differentiation from the other indicia.

The gauge may include an isolation valve to open and close fluid connection between the refrigeration system and the pressure sensing port. The gauge may include a fitting for making an external connection to the gauge including fluid connection to the pressure sensing port.

The at least one pressure zone indicia may include a safe zone indicia representing a range of pressure from about 0 to 500 microns, and a working zone indicia representing a range of pressure from about 500 to 2000 microns. The at least pressure zone indicia may include a leak indicating zone indicia representing a range of pressure from about 2000 to 25,400 microns. The at least pressure zone indicia may include a non-working zone indicia representing a range of pressure from about 25,400 to 30,000 microns.

The safe zone indicia may be green and the working zone indicia may be blue. The leaking indicating zone indicia may be yellow. The non-working zone indicia may be red.

In a second aspect the invention provides a service tool combination for use in association with a refrigeration system having a service fitting with a threaded valve core including a valve pin extending from the valve core. The combination includes a body assembly having a main conduit and opposing service fitting and system fitting at either end of the main conduit. The body assembly has an isolation valve between the service fitting and the system fitting such that the isolation valve has an open position permitting fluid communication through the main conduit between the service fitting and the system fitting, and a closed position preventing such fluid communication. The isolation valve has a user accessible handle for actuation of the handle between the open position and the closed position. The body assembly further has an auxiliary conduit extending at an angle from the main conduit between the system fitting and the isolation valve, and terminating in an auxiliary fitting.

The combination further includes a shaft assembly that has a shaft slidably and rotatably extending through a shaft nut, the shaft having a driver bit at one end for engaging the valve core of the refrigeration system and a gripper through which the pin extends and is retained. The shaft nut and service fitting form a releasable sealed connection such that the shaft assembly may be attached to or removed from the body assembly. The shaft extends through the body assembly such that the driver bit can engage and rotate the valve core and the gripper can retain the valve pin when the system fitting of the body assembly is sealingly connected to a corresponding service fitting on the refrigeration system.

The combination further includes a vacuum gauge that has a pressure sensing port in direct sealed connection with a fitting for releasable sealed fluid connection through the auxiliary fitting to the auxiliary conduit to receive fluid through the auxiliary conduit for pressure sensing. The direct sealed connection between the pressure sensing port and the fitting may be a rigid direct connection.

The vacuum gauge may be a vacuum gauge in accordance with the first aspect.

In a third aspect the invention provides a method of servicing a refrigeration system. The method includes connecting a combination of the first aspect at the system fitting to a service fitting of the refrigeration system and slidably extending the shaft assembly in the shaft nut with the isolation valve open to engage a valve core of the service fitting of the refrigeration system and retain a pin of the valve core, rotating the shaft such that the driver bit rotates and removes the valve core, slidably retracting the shaft assembly such that the valve core passes the isolation valve, closing the isolation valve, removing the shaft assembly from the body assembly, connecting a vacuum pump to the service port of the body assembly, opening the isolation valve, operating the vacuum pump to draw a vacuum through the service port of the body assembly, and sensing the pressure in the refrigeration system using the vacuum gauge to display sensed pressure.

The method may further include opening the vacuum gauge isolation valve when pressure in the system is at or below atmospheric pressure.

In a fourth aspect the invention provides a refrigeration system service tool. The tool includes a body assembly that has a main conduit and opposing service fitting and system fitting at either end of the main conduit. The body assembly further has an isolation valve between the service fitting and the system fitting such that the isolation valve has an open position permitting fluid communication through the main conduit between the service fitting and the system fitting, and a closed position preventing such fluid communication. The isolation valve has a user accessible handle for actuation of the handle between the open position and the closed position.

The tool further includes a shaft assembly that has a shaft slidably and rotatably extending through a shaft nut. The shaft has a driver bit at one end for engaging the valve core of the refrigeration system and a gripper through which the pin extends and is retained. The shaft nut and service fitting form a releasable sealed connection such that the shaft assembly may be attached to or removed from the body assembly. The shaft extends through the body assembly such that the driver bit can engage and rotate the valve core and the gripper can retain the valve pin when the system fitting of the body assembly is sealingly connected to a corresponding service fitting on the refrigeration system.

The driver bit forms part of a torque tube extending from the shaft. The torque tube defines a cylindrical hollow between the shaft and the driver bit, and the gripper is in the hollow, wherein the torque tube has a pin entryway through the driver bit such that a valve core pin can extend through the entryway into the gripper when the driver bit is engaged with the valve core. The gripper has a deformably resilient retaining ring, tubular sidewalls extending from the retaining ring away from the pin entryway and terminating in a base having a greater depth and diameter than the pin entryway. The retaining ring has a smaller external diameter than the diameter of the hollow to permit the ring to stretch as a head of the pin is pushed through the ring and to releasably retain the pin within a cavity of the gripper defined by the retaining ring, sidewalls and base.

The body assembly may include an isolation valve between the service fitting and the system fitting such that the isolation valve has an open position permitting fluid communication through the main conduit between the service fitting and the system fitting, and a closed position preventing such fluid communication, and the isolation valve may have a user accessible handle for actuation of the handle between the open position and the closed position.

The tool may include an auxiliary conduit extending at an angle from the main conduit between the system fitting and the isolation valve, and terminating in an auxiliary fitting. The gripper may be formed of rubber. The rubber may be VITON rubber.

Other aspects of the invention, and further details of the above aspects, are evident based on the detailed description, drawings and claims herein.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention and in which.

DETAILED DESCRIPTION OF THE PREFERRED EMBODIMENT

Figure 1:
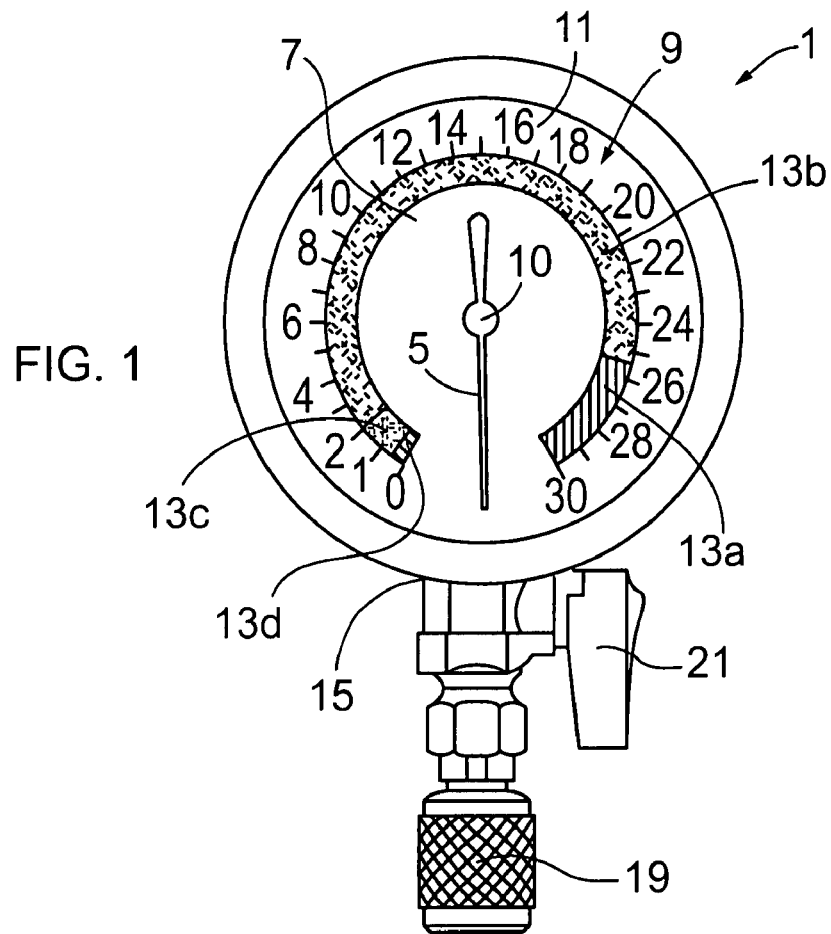
FIG. 1 is a perspective view from in front, below and to one side of a vacuum gauge in accordance with an embodiment of an aspect of the invention.

For simplicity in the FIGS., reference numerals are not necessarily repeated for each FIG. where a component is introduced and described with respect to another FIG. The description applies from one FIG. to the next for the same components even where a reference numeral is not used.

Figure 2:
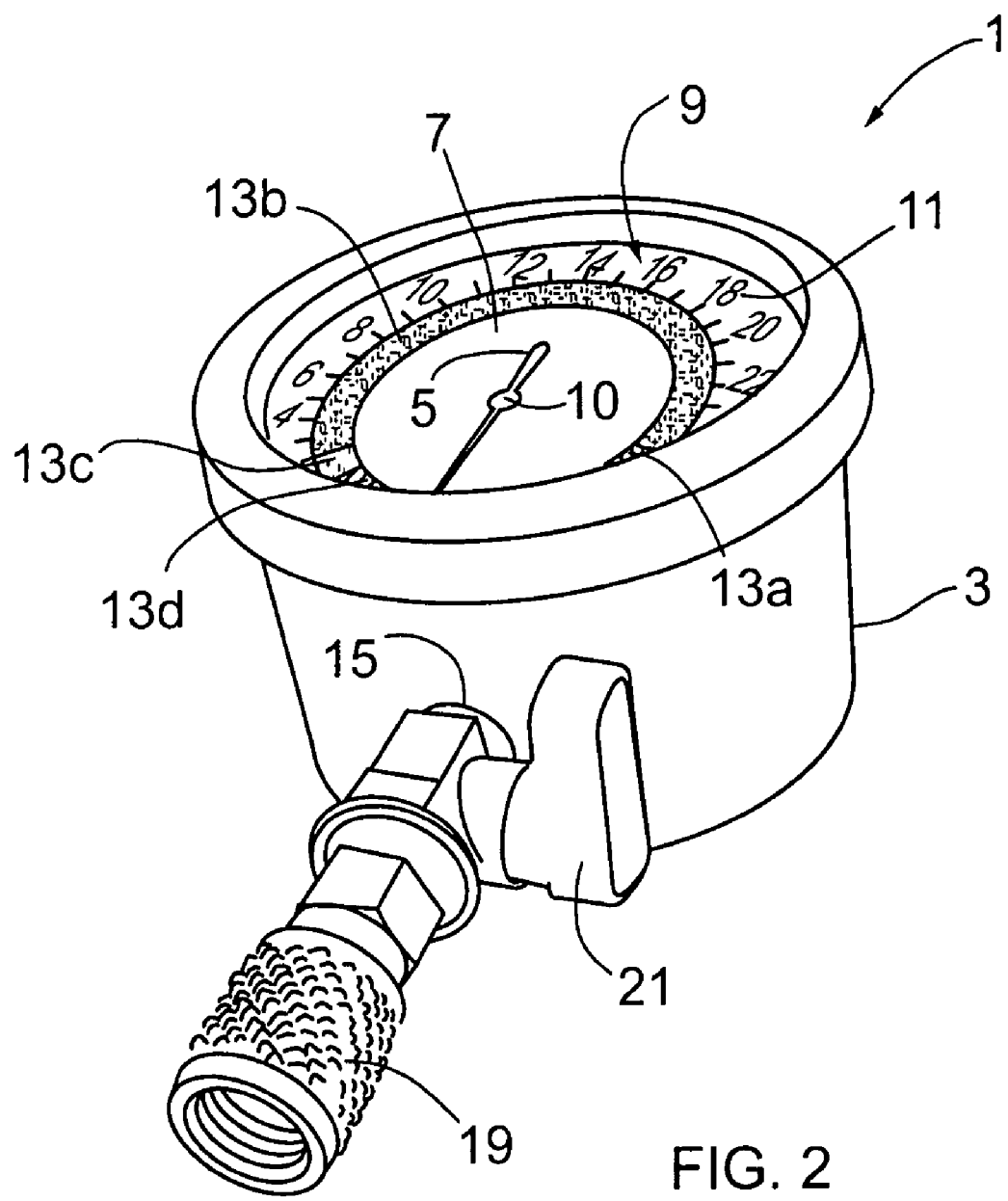
FIG. 2 is a front view of the gauge of FIG. 1.

Referring to FIGS. 1 and 2, a vacuum gauge 1 has a pressure sensing mechanism within housing 3. Extending from the mechanism and housing 3 is an indicator 5. Between the indicator 5 and the mechanism and housing 3 is a face 7. On the face 7 is a scale 9 arranged in an arc about a central point 10. The indicator 5 is rotatably mounted at the central point 10 to the mechanism and housing 3 such that the indicator 5 indicates a particular location on the scale 9 from one end of the scale 9 to an opposing end of the scale 9.

The scale 9 and indicator 5 can take alternate analog forms, such as for example, a scale arranged in a straight line with a sliding indicator. Such a scale and indicator may require a mechanical adaptor to translate the output of the mechanism from a rotational force, as is typically the case with analog vacuum gauges, to a linear force. Electronic displays of an indicator 5 on an analog scale 9 may also be used; although, this may require a source of power, such as batteries.

In operation, the vacuum gauge 1 senses pressure through the mechanism and housing 3. The mechanism and housing 3 causes the indicator 5 to move in accordance with the sensed pressure.

The scale 9 has numeric pressure indicia 11 spaced evenly about the scale 9. The scale 9 is divided into multiple distinct pressure zones indicia 13a-d. The distinct pressure zones indicia 13a-d represent different, contiguous pressure ranges, namely a non-working zone indicia 13a, a leak indicating zone indicia 13b, a working zone indicia 13c, and a safe zone indicia 13d.

The non-working zone indicia 13a represents a pressure range where little or no moisture or non condensables have been removed, and no useful work is being done. The leak indicating zone indicia 13b represents a pressure range where some work may be occurring; however, not in a substantial way. This zone can be particularly useful for leak detection, for example, by drawing a vacuum to this leave and determining if pressure remains stable when the system is isolated from the vacuum pump. Methods of isolating the connecting a vacuum pump and gauge to a refrigeration system and isolating the pump while retaining connection to the gauge 1 are discussed elsewhere herein. If pressure does not remain stable then there is likely a leak or other fault in the operation of the system. The working zone indicia 13c represents a pressure range where moisture is being boiled off and most work takes place. The safe zone indicia 13d represents a pressure range where non-condensables have been effectively removed. It is safe to begin charging the unit once all non-condensables have been removed.

In the example shown in the FIGS. the non-working zone indicia 13a represents a pressure range of about 30,000 to 25,400 microns, the leak indicating zone indicia 13b represents a pressure range of about 25,400 to 2,000 microns, a working zone indicia 13c represents a pressure range of about 2,000 to 500 microns, and a safe zone indicia 13d represents a pressure range of about 500 to 0 microns. 30,000 microns is well below atmospheric pressure. This is used as a starting point for the scale 9 to limit the overall size of the useful portion of the scale. The non-working zone may start above or below 30,000 microns. Displaying a non-working zone 13a is useful to provide the technician with an indication that the servicing equipment is in use.

The zone indicia 13a-d may be colour coded for ease of differentiation by a user. The colors may be selected to represent what is occurring within the different pressure ranges, for example the non-working zone indicia 13a may be colour coded in red, the leak indicating zone indicia 13b in yellow, the working zone indicia 13c in blue, and the safe zone indicia 13d in green. These particular colour codings can be user friendly in that a technician with minimal training can understand that red is a zone that is not to be used, yellow is a zone where something useful may be happening although the system or servicing equipment is not operating properly if one cannot get below this zone and there is likely a leak of some sort, blue indicates that water is being boiled off, and green indicates that it is safe to proceed to charge the system. Other zone indicia codings for user differentiation may be used, such as for example, distinct patterns or shading.

For large systems, typically classified as industrial, it has been found that 700 microns and below is an acceptable safe level before charging the system with refrigerant. For smaller systems, typically classified as residential, it has been found that 500 microns and below is preferable before charging.

The mechanism and housing 3 includes a pressure sensing port 15 for receiving fluid, the pressure of which is to be sensed. The port 15 is in direct sealed fluid connection with a fitting 19 for making an external connection so as to in turn be in fluid connection, directly or indirectly, to a refrigeration system, and the port 15 is thus accessible for fluid connection to the refrigeration system. In this sense, a direct connection requires no intervening connection or only permanent intervening connections without releasable fittings. Such direct connections are far less likely to be the subject of leaks than connections formed with releasable fittings. The direct connection is also a rigid direct connection as there are no hoses utilized between the pressure sensing port 15 and the fitting 19. Hoses can introduce additional sources of leaks by outgassing through the hose material and also through the introduction of potentially weak permanent connections to the hose material.

In the example provided in the FIGS, the fitting 19 is a standard ¼ inch female flare fitting. Other fittings may be used as desired. For example, the gauge 1 may be indirectly connected at the fitting 19 through a T-fitting, not shown, to a refrigeration system, while the T-fitting is also connected to a vacuum pump, such that the vacuum pump can draw the vacuum, while the vacuum gauge 1 reads the pressure within the system. In this description, a T-fitting includes any fitting that permits at least three connections, one for the gauge 1, one for the system, and one for a vacuum pump, charging system or other refrigeration system service device. The fitting is not required to provide those connections in a perpendicular configuration. For example, Y or other non-perpendicular configuration may be used.

As an alternative, the vacuum gauge 1 may be integrated with dual fittings to allow connection to the system and a service device, while sensing pressure of fluid flowing between the fittings.

The vacuum gauge 1 has an isolation valve 21 to prevent and to permit fluid connection to the mechanism and housing 3. In the embodiment shown in the FIGS. the isolation valve 21 is a ¼ turn valve in an open position such that fluid connection is available to the mechanism and housing 3. The isolation valve 21 can be closed to prevent fluid communication with the vacuum gauge. This is a protection feature as the mechanism and housing 3 of a vacuum gauge is typically designed to operate within the range represented on the scale 9. Pressures above atmospheric may result in damage to the mechanism and housing 3. This could occur for example during charging of the system, or if the system contains refrigerant under pressure. Typically, the system will be evacuated and the refrigerant recovered prior to attempting to pull a deep vacuum for which the gauge 1 would be useful.

Various mechanisms may be used for the mechanism and housing 3. For example, the mechanism may be a diaphragm aneroid-type using a series of metallic capsules to cover the full scale 9 of pressure, and having associated drive mechanics for driving the indicator 5. This type of gauge is known in the art and can provide a high degree of accuracy. For example, the vacuum gauge 1 of the FIGS. had an accuracy of 1% from 1 to 10000 microns and 2.5% from 10000 to 30000 microns. The housing of the mechanism and housing 3 may simply be sealed metal to support and protect the mechanism. Other mechanisms may include, for example, a bourdon tube with associated drive mechanics; however, the accuracy of such gauges is generally not as high as the diaphragm aneroid gauge with capsules. Other mechanisms may be used as desired for required accuracy in a particular application.

The gauge 1 is an example of an analog vacuum gauge with zone indicia and an indicator to allow more effective reading of service information when servicing a refrigeration system. In operation, the gauge 1 can be connected to a refrigeration system through a T-fitting to the system and a vacuum pump. The vacuum pump draws a vacuum and the indicator 5 moves along the scale 9 as pressure drops within the system. An operator can easily identify how the system is performing under vacuum by looking at the zone indicia 13a-d indicated by the indicator 5. If the pressure drops into the zone indicia 13d then the operator knows it is safe to charge the system. The operator can then charge the system with refrigerant. Depending on the number of connections available, the operator may fluidly disconnect the vacuum pump by closing a ball valve, check valve or other such shutoff device, and connect the charging system by opening a further ball valve, check valve or other shutoff device. If additional connections are not available then the vacuum pump may be removed after the ball valve, check valve or shutoff valve is closed. The charging system can then be connected to the closed shutoff valve and the valve opened to allow charging of the system.

If the indicator 5 does not reach into zone indicia 13d then the vacuum operation will need to be performed again and additional service to the system or service equipment may be required.

The gauge 1 may also be used to diagnose system conditions by pulling a vacuum midway into working zone 13c, isolating gauge 1 and vacuum pump, and reading the zone 13a-d of the indicator 5. If pressure rises into the bottom of the leak indicating zone 13b and stabilizes, for example to a pressure of 2000-2300 microns, then the system has high moisture content, residual refrigerant, and non-condensables or a combination thereof. Diagnosis may take place before or after evacuation has been completed. A pre-diagnosis may allow a technician to confirm or rule out the existence of specific conditions. A post-diagnosis may be used to confirm that evacuation was properly carried out.

In order to use this diagnostic feature, the zone indicia on the gauge 1 must include at least the working zone indicia 13c as the technician would be seeing that the working zone has been entered and that the indicator 5 moves above the working zone indicia 13c. In order to be sure that it is safe to charge the system then it is only necessary to have the safe zone indicia 13d. Different combinations of zones could be included on the scale 9 depending on the features desired to be usable. The scale 9 has the numerical pressure indicia 11 or dispense with the indicia 11 and rely solely on the zone indicia 13 selected for display.

Figure 3:
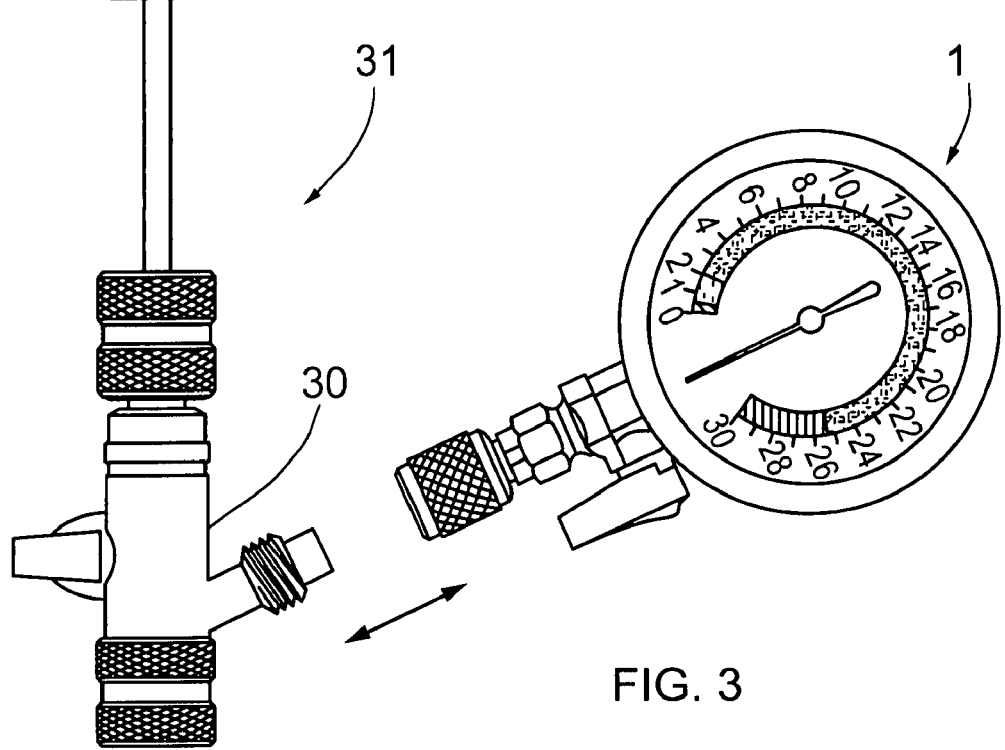
FIG. 3 is a front view of a the gauge of FIG. 1 in combination with a valve core removal tool in accordance with another embodiment of an aspect of the invention.

Referring to FIG. 3, an example of a T-fitting with which the gauge 1 may be used is valve core removal tool body assembly 30 of a valve core removal tool 31.

Figure 4:
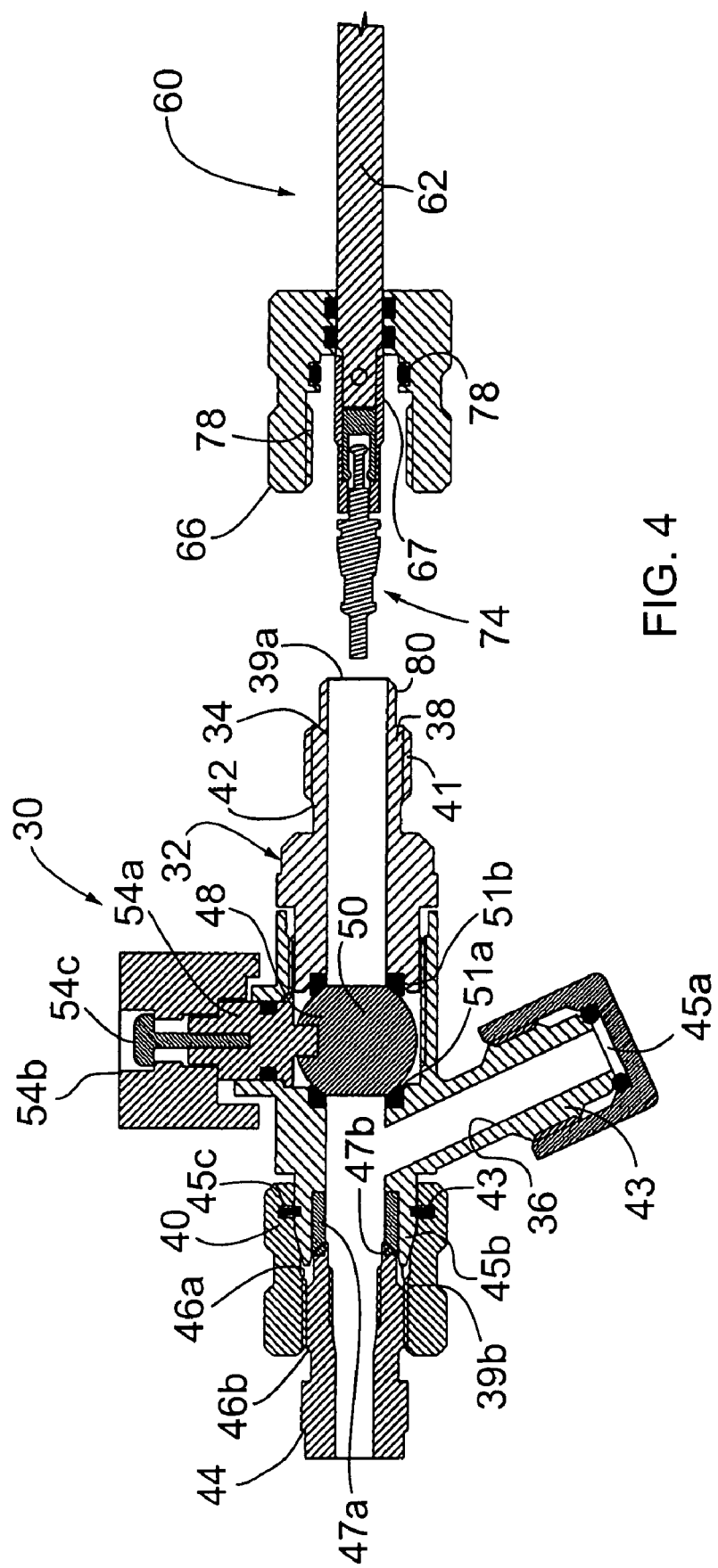
FIG. 4 is a longitudinal cross-section of the valve core removal tool of FIG. 3 attached to a service fitting of a refrigeration system with a shaft assembly of the tool removed from a body assembly of the tool, and a valve core of the service fitting attached to the shaft assembly, and an isolation valve of the body assembly in a closed position.

Referring to in particular FIG. 4, the assembly 30 has a body 32 with a main conduit 34 and an auxiliary conduit 36 extending from the main conduit 34. The assembly 30 has a male fitting 38 at one end (the service end 39a) of the body 32 about the conduit 34 and a female fitting 40 at an opposing end (the system end 39b) of the body 32. The male fitting 38 has threads 41 along a portion of its exterior surface 42. The threads 41, as are all threads of the FIGS., are represented generically by a hatched block. The assembly 30 has male fitting 43 about an open auxiliary end 45a of the auxiliary conduit 36.

The female fitting 40 is sized to fit a corresponding male fitting 42 on the refrigeration system to be serviced. Typically the fitting 40 will be sized to fit a low side fitting of the refrigeration system; however, the fitting 40 may be sized to fit a high side fitting of the refrigeration system if the high side fitting has a different size than the low side fitting. Where the refrigeration system has different sized fitting it may be desirable to have a set of assemblies 30 or tools 31, each member of the set for the different sized fittings of the refrigeration system. Similarly, for use with different systems it may be desirable to have more assemblies 30 with a variety of fittings 40 to match the systems. A set of assemblies 30 or tools 31 may be packaged together with a gauge 1 as a kit for later connection of the gauge 1 to an assembly 30 for use. For example, two tools 31, one for a high side fitting and one for a low side fitting of a particular refrigeration system may be packaged together with a single vacuum gauge 1. The tools 31 may be provided with a shaft assembly 60 (to be discussed) separate from the assembly 30. One shaft assembly could be provided for use with multiple tool assemblies 30; however, the cost savings will typically not justify the potential inconvenience of switching a shaft assembly 60 between assemblies 30. Also, cross-contamination between refrigeration systems with potentially incompatible contents, for example different refrigerants, should be avoided.

The female fitting 40 includes a swivel nut attached to the body 32 using a retainer chip 43 that is snapped into place over a narrowed section 45b of the body 32 to engage opposing grooves 45c in the fitting 40 and the narrowed section 45b. The fitting 40 is able to rotate about the body 32 such that threads 46a on the fitting 40 can engage corresponding threads 46b on the fitting 44. A tubular seal 47a fits sealingly within the narrowed section 45b to provide a similar internal diameter as the main conduit 34 and prevent the egress of pressurized fluid from the main conduit 34 between the seal 47a and the body 32. The seal 47a has an external contour 47b to sealingly engage an exposed end of the system male fitting 44. The seal 47a in the example shown in the FIGS. is a stiff seal to prevent the seal 47a from deforming substantially under compression when the fitting 40 is engaged with the fitting 40. Substantial deformation may cause the seal 47a to narrow the main conduit 34 and limit its use for the purposes described herein. Neoprene is typically not stiff enough for these purposes. Material sold under the trademark TEFLON has been found to be suitable. A TEFLON seal has also been found to wear evenly in use.

The assembly 30 has an isolation valve 48 in the main conduit 34 between the auxiliary conduit 36 and the fitting 38. The isolation valve 48 has a ball 50 held in place by the body 32 and O-ring seals 51a, 51b. The ball 50 has a conduit 52 (see FIG. 5) of similar internal dimension to the main conduit 34 such that rotation of the ball 50 allows for alignment of the conduits 34, 52 to provide an open position (see FIG. 5), and further rotation of the ball 50 allows for non-alignment of the conduits 34, 52 to provide a closed position (see FIG. 4) in which one end 39a of the conduit 34 is isolated from the other end 39b. A pivot stem 54a is longitudinal held in place by the ball 50 and the body 32. The pivot stem 54a is rotationally fixed to the ball 50, while being allowed to rotate with respect to the body 32. The pivot stem 54a extends through the body 32 between the ball 50 and a handle 54b to allow for rotation of the ball 50 between the open position and the closed position by turning the handle 54b. The handle 54b is fixed to the pivot stem 54a by bolt 54c. A ¼ turn isolation valve 48 is shown in the FIGS. and can be convenient. An isolation valve 48 requiring more or less rotation can be used. An isolation valve 48 may also take other forms to allow for movement between an open position and a closed position. The auxiliary conduit 36 remains open to the system end 39b whether the isolation valve 48 is in the open position or the closed position; however, a further isolation valve could be included if desired.

Although threaded connections are described herein, other connections such as snap-on quick connectors often used in conjunction with R134A automotive air conditioning systems may be used. Where the fitting 44 of the refrigeration system has a different configuration than that shown in the FIGS. then the fitting 40 will change correspondingly, for example, to a snap-on connector for R134A systems.

Referring in particular to FIGS. 5, 6, 7 and 8, an extractor shaft assembly 60 has a shaft 62 terminating in a knob 64. The assembly 30 and assembly 60 together form the valve core removal tool 31 (see in particular FIGS. 5 and 8). The assembly 60 also has a shaft nut 66 through which the shaft 62 extends. Torque tube 67 extends from shaft 62 opposite knob 64. The torque tube 67 terminates in a valve core driver bit 68 (see in particular FIGS. 6 and 7). The torque tube 67 is held in place on the shaft 62 using a pin 72. The shaft 62 narrows to receive the torque tube 67. The torque tube 67 has an external dimension greater than opening 70 in the shaft nut 66 through which shaft 62 extends, while the torque tube 67 has an outside diameter narrow enough to fit within the system fitting 44 to reach a valve core 74 (see FIG. 5). This prevents the shaft 62 from being withdrawn from the shaft nut 66. O-ring seals 76 are held in place by the shaft nut 66 about the shaft 62 to provide a fluid seal between the shaft 62 and the shaft nut 66 (see detail FIG. 6).

The shaft nut 66 has internal threads 78 corresponding with the external threads 41 of the male fitting 38. A further o-ring seal 78 is held in place by the shaft nut 66 about a sealing surface extension 80 of the male fitting 38 to provide a fluid seal between the male fitting 38 and the shaft nut 66 when the shaft nut 66 is threaded onto the male fitting 38 (see FIG. 5). The shaft 62 is long enough to allow the driver bit 68 to extend through the main conduit 34 when the isolation valve is open and to engage the valve core 74 before the knob 64 meets the shaft nut 66.

Figure 6:
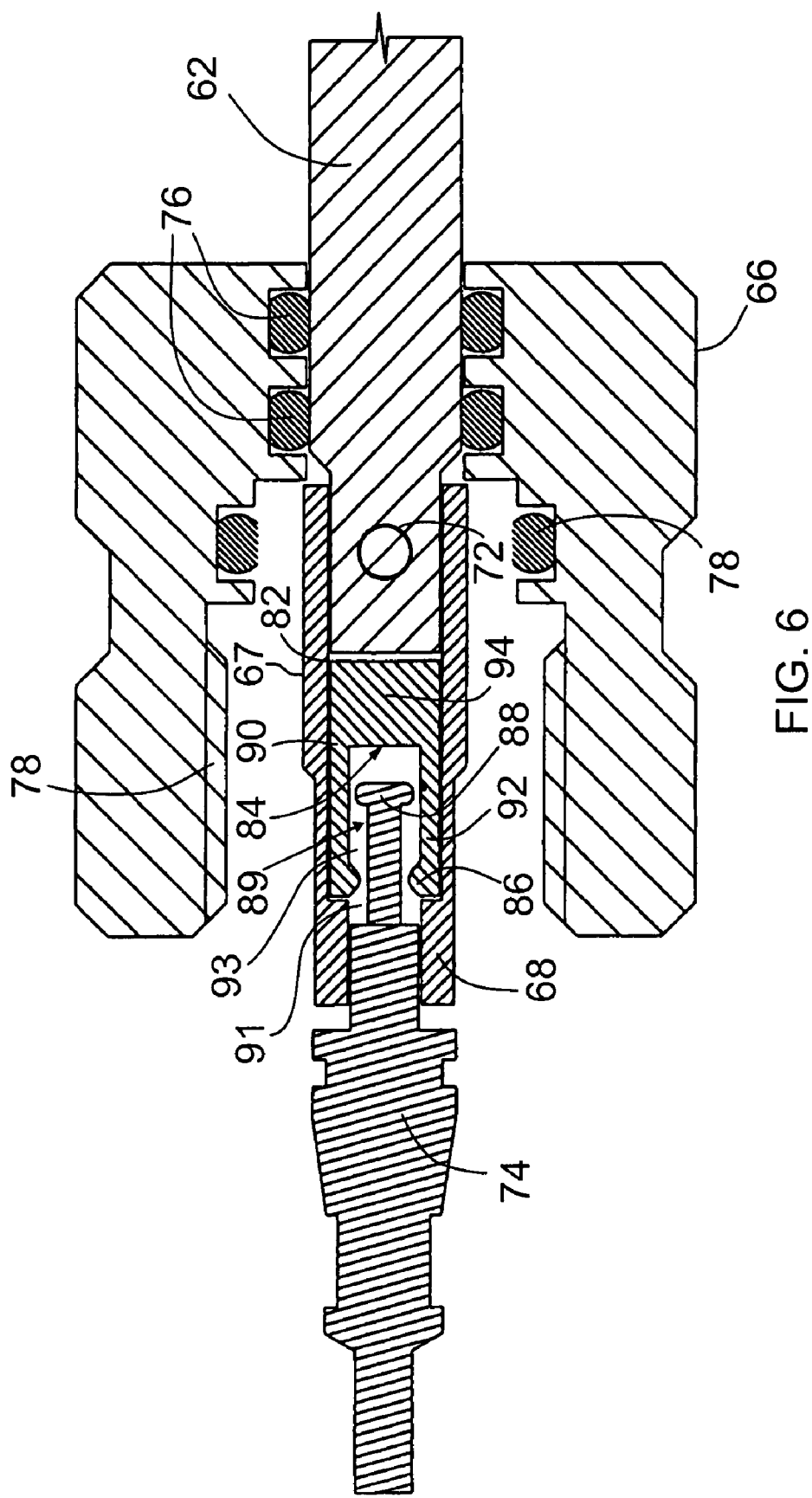
FIG. 6 is a detailed cross-section of a portion of the shaft assembly of FIG. 4 attached to the valve core.
Figure 7:
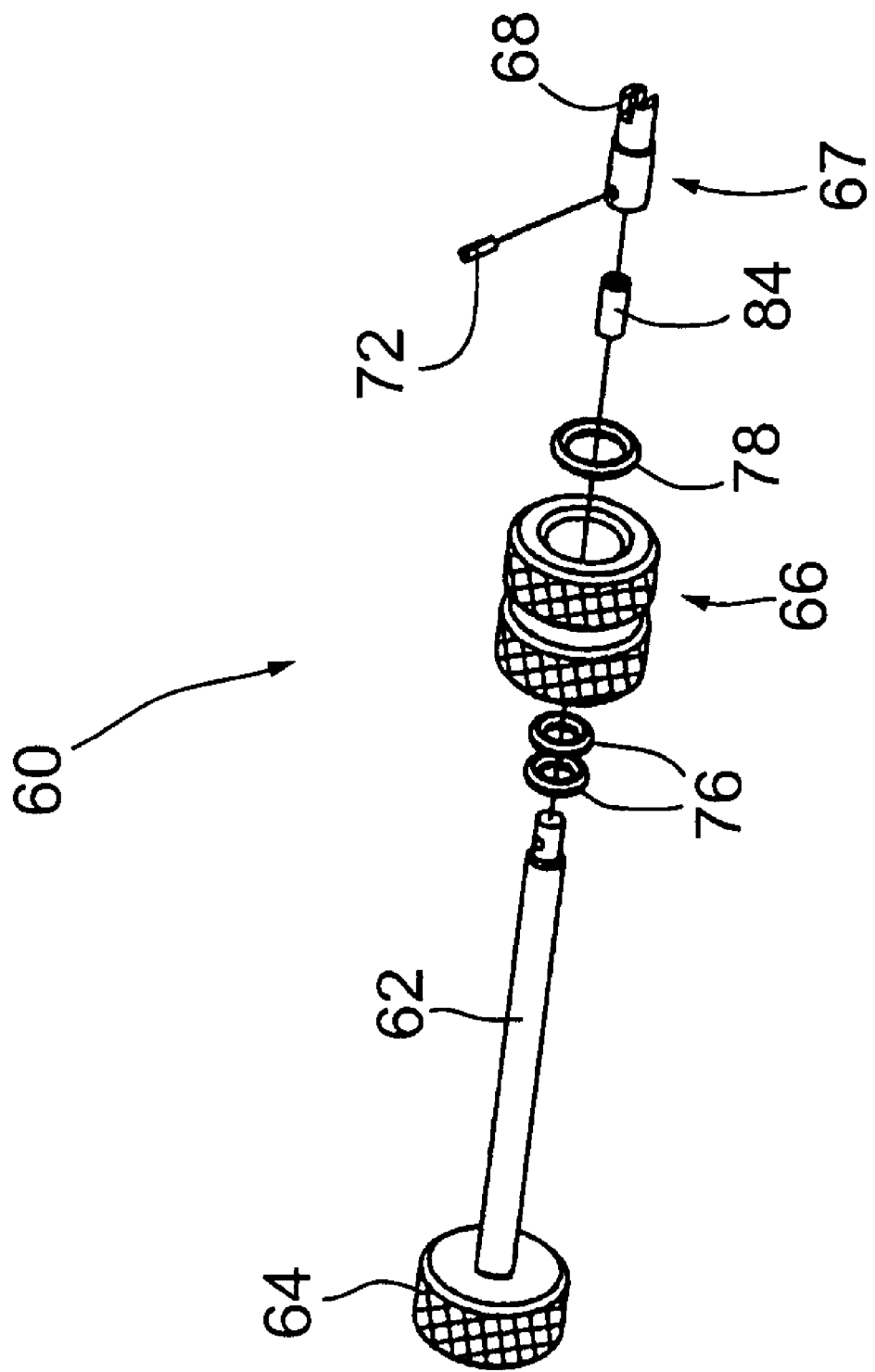
FIG. 7 is an exploded perspective view of the shaft assembly of FIG. 4.
Figure 8:
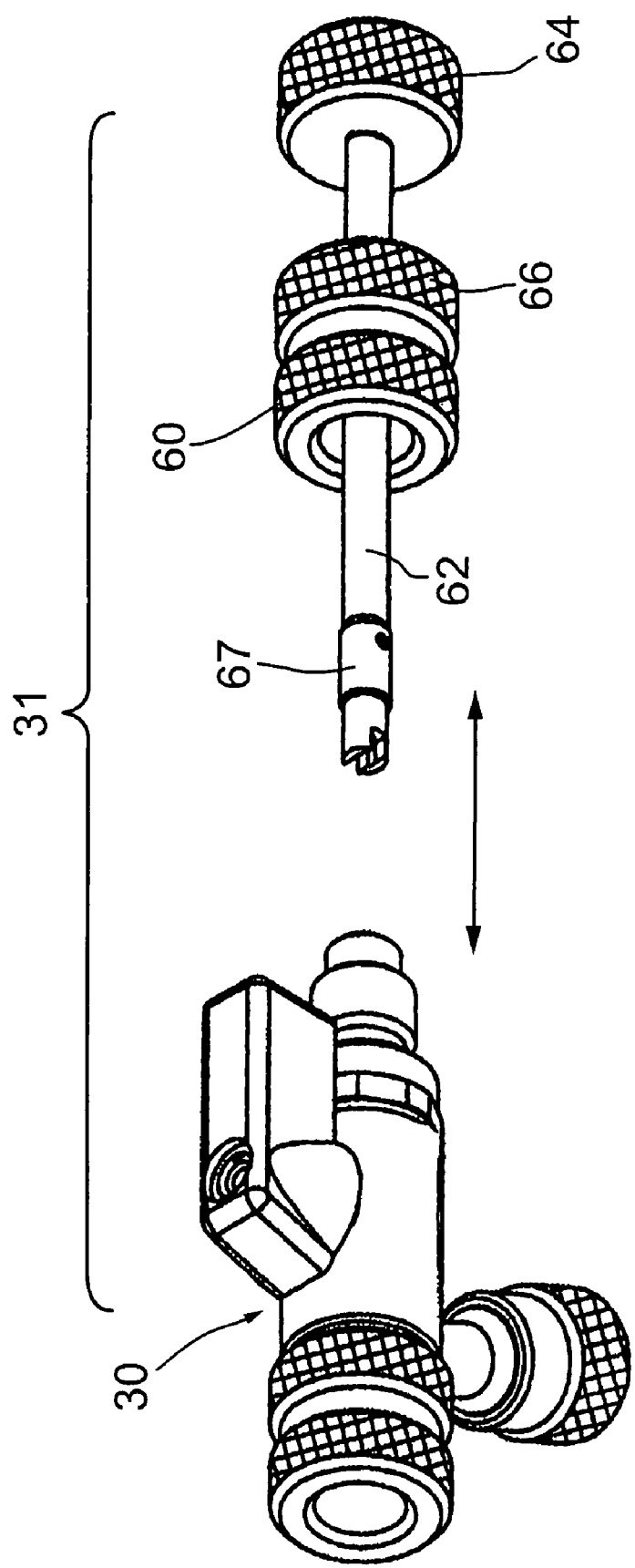
FIG. 8 is a perspective view the tool of FIG. 3 with the shaft assembly removed from the body assembly.
Figure 9:
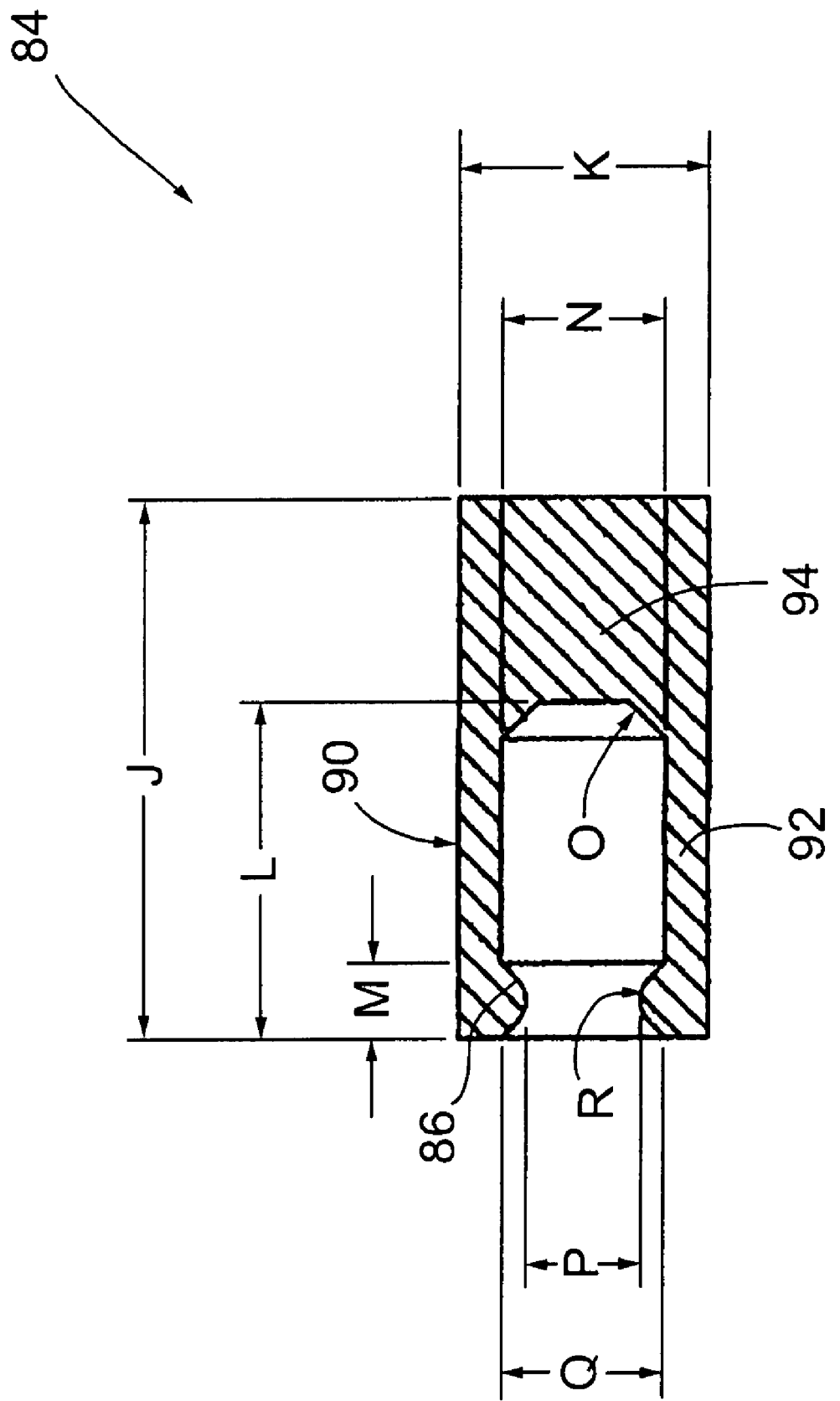
FIG. 9 is longitudinal cross-section of a gripper of the tool of FIG. 3.
Figure 12:
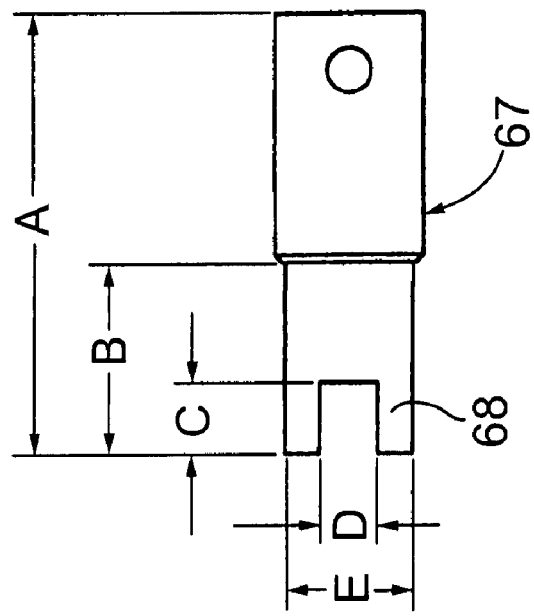
FIG. 12 is a side view of the torque tube of FIG. 10, and FIG. 13 a longitudinal cross-section of the valve core removal tool of FIG. 3 attached to a service fitting of a refrigeration system with the shaft assembly of the tool attached to the body assembly of the tool, and the valve core of the service fitting attached to the shaft assembly, and an isolation valve of the body assembly in a closed position.
Figure 11:
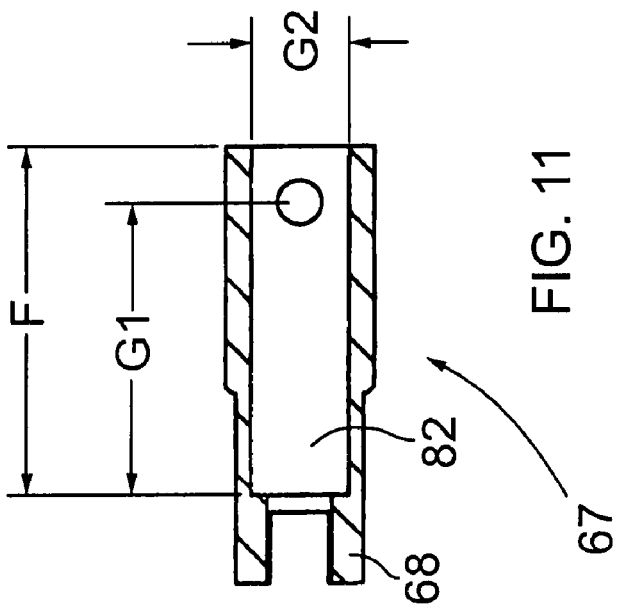
FIG. 11 is a longitudinal cross-section of the torque tube of FIG. 10 along the lines A-A of FIG. 10.
Figure 10:
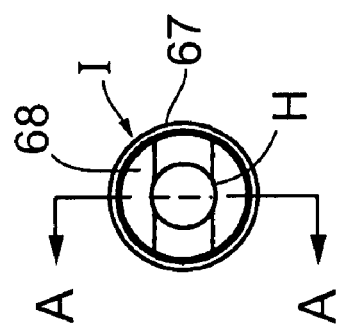
FIG. 10 is an end view into a driver bit of a torque tube of the tool of FIG. 3.

The torque tube 67 defines a cylindrical hollow 82 into which a valve core gripper 84 fits between the driver bit 68 and the shaft 62 (see FIG. 6). The valve core gripper 84 (see detail FIG. 9) has a resiliently deformable retaining ring 86 to receive and releasably retain a head 88 (see FIG. 6) of the pin 89 of the valve core 74. The ring 86 is sufficiently deformable to allow pins 89 of a wide variety of diameters to pass through the ring 86, while being sufficiently resilient to return to its original form to retain the pin 89. The ring 86 is integrated with a gripper body 90 of sufficient substance to prevent the gripper 84 from being pulled out by the pin 89 from the tool 31 through a pin entryway 91 through the central axis of the bit 68.

In the example shown in the FIGS. The gripper body 90 has a cylindrical sidewall 92 defining a chamber 93 within which the pin 89 is received. The sidewall 92 terminates in a cylindrical base 94 of greater depth and diameter than the diameter of the pin entryway 91. Thus, the gripper 84 cannot be drawn out through the pin entryway 91 by a pin 89. The gripper 84 has an external diameter smaller than the diameter of the hollow 82 such that the gripper 84 can expand sufficiently to allow pins 89 of large diameter to pass through the retaining ring 86.

In the example shown in the FIGS., dimensions from FIGS. 9-12 that have been shown to provide suitable performance are provided in Table A below. These dimensions are provided as examples only. It is to be recognized that other dimensions can be utilized to provide the features and functions provided herein as will be evident to those skilled in the art based on the principles described herein.

| | |
|---|---|
| A | 0.620 inch |
| B | 0.270 inch |
| C | 0.100 inch |
| D | 0.082-0.078 inch |
| E | 0.180-0.176 inch |
| F | 0.495-0.490 inch |
| G1 | 0.415-0.410 inch |
| G2 | 0.139-0.136 inch |
| H | 0.092-0.088 inch radius |
| I | 0.210 inch radius |
| J | 0.290-0.285 inch |
| K | 0.134-0.128 inch |
| L | 0.180 inch |
| M | 0.040 inch |
| N | 0.088 inch |
| O | 0.20 inch chamfer or radius |
| P | 0.060-0.058 inch |
| Q | 0.088 inch |
| R | 0.015 inch radius |
| All corners | 0.010 inch radius unless otherwise noted |
| All angles | 45° unless otherwise specified |
| Tolerances (for single dimensions specified to hundreds of an inch) | +/−0.010 inch |
| Tolerances (thousands) | +/−0.005 inch |
| Tolerances (for angular dimension) | +/−1° |

The tool 31, other than the various seals mentioned previously and the gripper 84, is generally made of hard materials able to withstand the pressures encountered in the tasks described herein, and the torque required to remove and to replace the valve core 74. In the example shown in the FIGS. the shaft 62 and torque tube 67 are made of stainless steel and the other hard components are formed from brass with a chrome or paint finish. Other suitable materials may be used in other combinations as desired.

In the example shown in the FIGS., the gripper 84 is formed from rubber sold under the trademark VITON of 90 durometer. The VITON rubber is relatively durable and allows for the stretch required for the ring 86. Neoprene could be used, but is generally not as durable for the application described herein. Other suitable materials may be used. The ball 50 seals can be a TEFLON seal for durability. The O-ring seals mentioned previously in the shaft assembly 60 can be standard O-rings used in refrigeration applications made, for example, from neoprene or VITON rubber (such as for example a VITON rubber of 70 durometer), or another suitable material.

Figure 5:
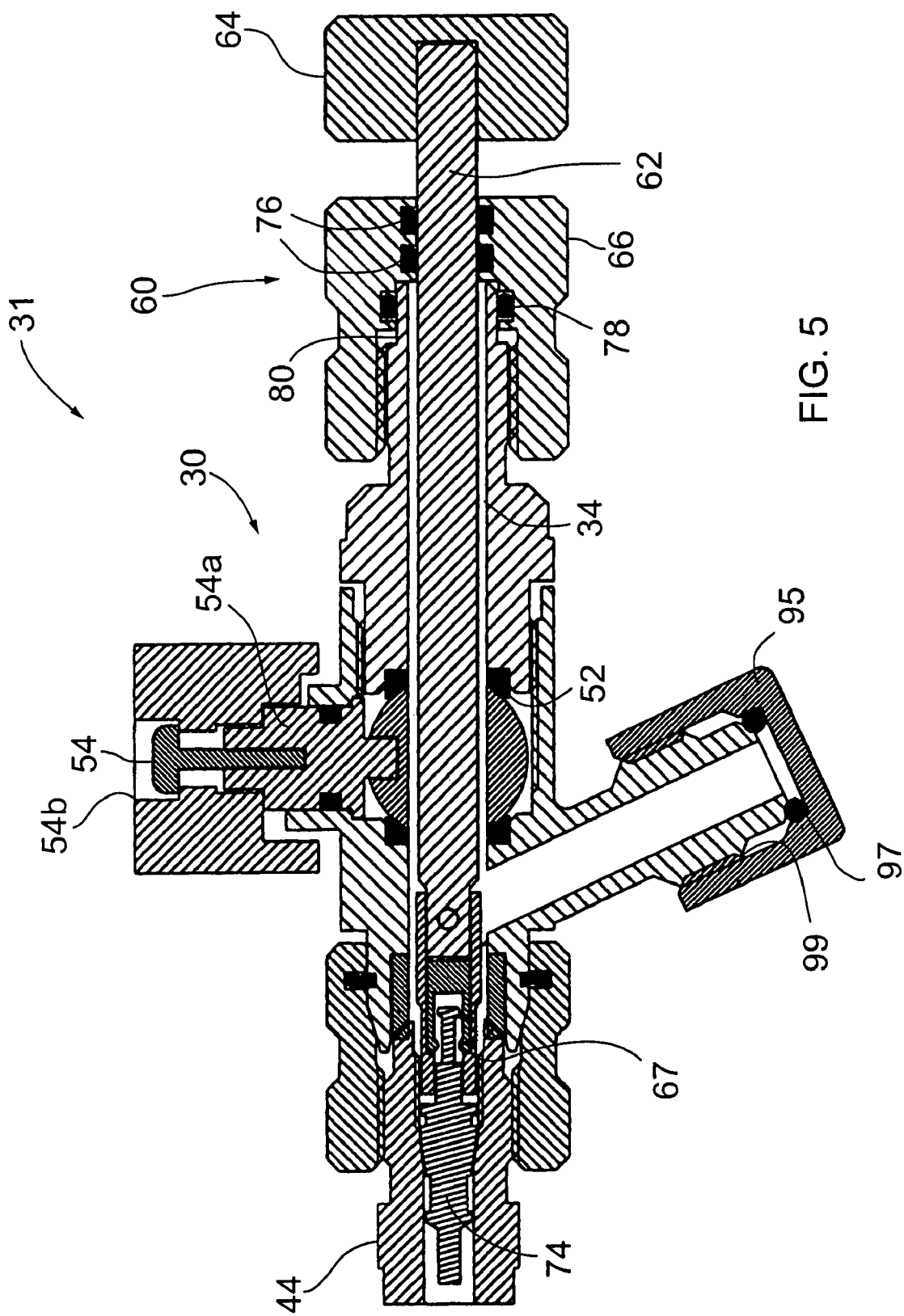
FIG. 5 is a longitudinal cross-section of the valve core removal tool of FIG. 3 attached to a service fitting of a refrigeration system with the shaft assembly of the tool attached to the body assembly of the tool, and the valve core of the service fitting attached to the service fitting, and the isolation valve of the body assembly in an open position.

A cap 95 can be provided to seal the male fitting 43 and auxiliary conduit 36 when not in use (see FIG. 5). The cap 95 contains an O-ring seal 97 and internal threads 99 to engage corresponding external threads on the fitting 43.

In use, to remove a valve core 74, the body assembly 30 is connected to the fitting 44, and the shaft nut 66 is threaded to the body 32. These actions can occur in any order.

Figure 13:
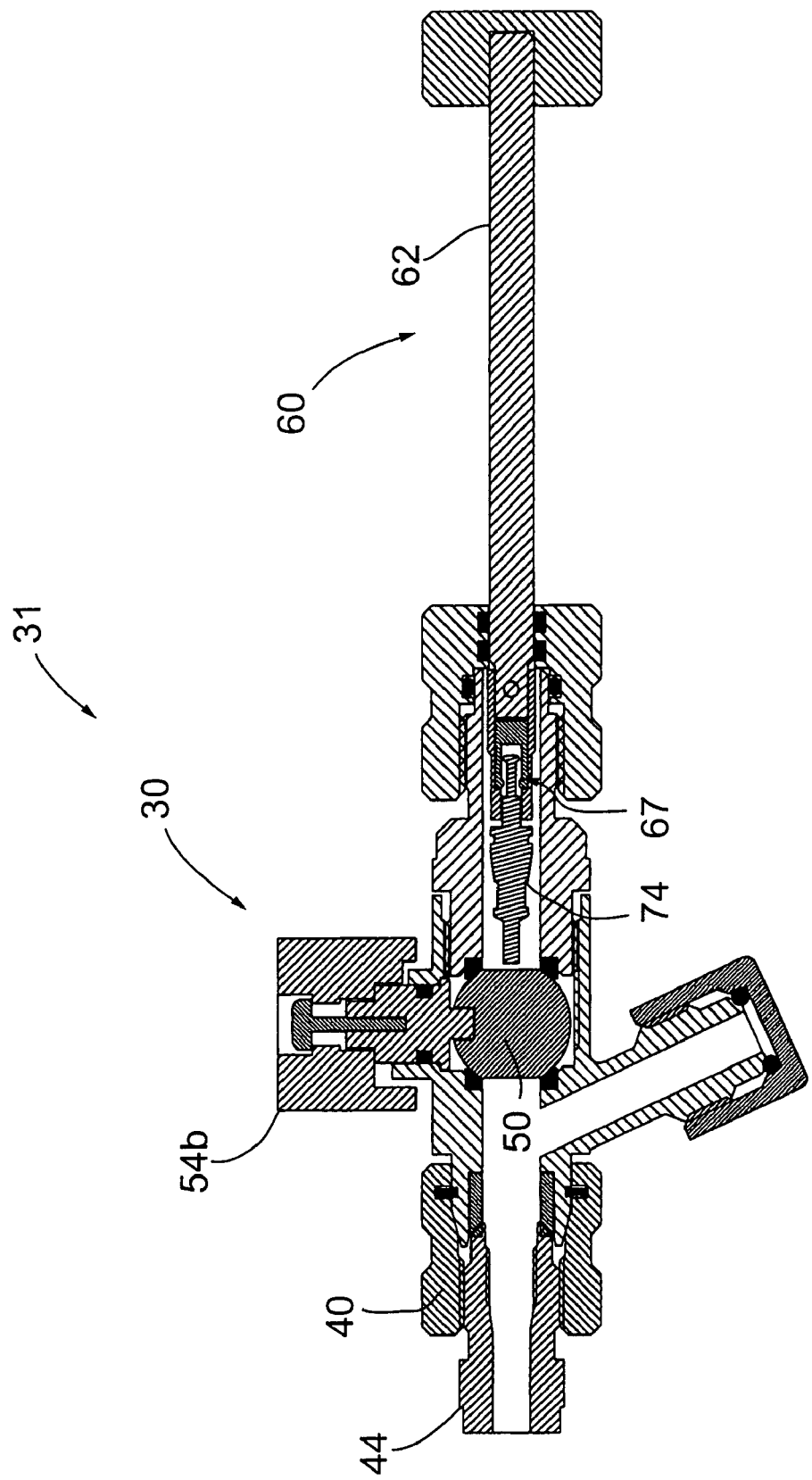

The shaft 62 is slidably extended through the main conduit 34 to engage the valve core 74 using the driver bit 68 (see FIG. 5). In doing so, the head 88 of the pin 89 is pushed through the ring 86 and the pin 89 is thereby retained by the ring 86 and, thus, the shaft assembly 60. The knob 64 is rotated such that the shaft 62 rotates in the shaft nut 66 and with respect to the body assembly 30 and the fitting 44 of the refrigeration system, typically counter-clockwise, such that the core 74 is unthreaded from the fitting 44. The shaft 62 is slidably retracted and the valve core 74 is drawn through the main conduit past the isolation valve 38. Thus, the shaft 62 is slidably and rotatably mounted in the shaft nut 66. The isolation valve 38 is then closed (see FIG. 13). The shaft assembly 60 is then removed from the body 32 by unthreading the shaft nut 66 from the body 32 (see FIG. 4). The valve core 74 remains retained by the ring 86. The valve core 74 can be removed from the shaft assembly 60 by pulling it away and drawing the pin 89 through the ring 86. For most valve cores 74 used in current refrigeration applications the particular example of the tool 31 described can receive and retain the pins 89 used therein to allow for removal of the cores 74 without inadvertent release of the cores 74, such as for example release of a core 74 in the main conduit 34 or release of the core 74 if the shaft assembly 60 is inadvertently shaken after removal from the assembly 30. Pins 89 are not standardized and can come in a wide variety of sizes.

Replacement of the valve core 74 can be performed by following the opposite steps.

The assembly 30 can be used to further service the refrigeration system. For example, after the valve core 74 and shaft assembly 60 have been removed, the system can be evacuated by connecting a vacuum hose and vacuum pump, not shown, to the fitting 38, opening the isolation valve 38 and turning on the pump. Alternatively, the vacuum hose can be connected to the male fitting 43 before the valve core 74 is removed then the valve core can be removed, the isolation valve 38 closed, and the vacuum drawn through the auxiliary conduit 36. In this case, the shaft assembly 60 need not be removed from the assembly 30 as it is not obstructing the auxiliary conduit 36.

Similarly, the system can be charged by connecting a charging hose and station, not shown, to the assembly 30 in the same manner as described for evacuation of the system using a vacuum hose or pump. In both cases, removal of the valve core 74 reduces the restriction in the fitting 44 to allow for more efficient evacuation or charging of the system.

The assembly 30 can be used in association with the gauge 1. Prior to removal of the valve core 74, the gauge 1 is connected to the assembly 30 at the male fitting 43, the assembly 30 is connected to the fitting 44, and the isolation valves 21, 38 are closed. Again, the order of these operations can be interchanged.

The valve core 74 is removed and a vacuum hose and vacuum pump are connected to the male fitting 38 is removed as described previously. The vacuum pump is switched on to begin evacuating the system. The isolation valve 21 is opened when the pressure is below pressure that will damage the gauge 1. For many vacuum gauges 1, pressure above atmospheric pressure can potentially damage the gauge 1 depending on the type of mechanism used for the gauge 1. This can happen if, for example, if the system is inadvertently charged when the isolation valve 21 is open, or if the refrigerant has not yet been recovered. Preferably, refrigerant is first recovered using a recovery machine, not shown. This should leave a partial vacuum in the refrigeration system if the system does not have major leaks. If desired, refrigerant can be recovered through the body assembly 30 after the core 74 has been removed. This provides a larger opening for more efficient recovery than if the core is left in during recovery. If recovery is performed through the tool 30 then the isolation valve 38 can be closed, the recovery machine disconnected, and the vacuum pump connected.

Once the vacuum gauge 1 is in fluid connection with the system then the system can be evacuated using the gauge 1 as described previously. Once a deep vacuum operation is complete then the isolation valves 21 and 38 can be closed. The vacuum hose can be removed and a charging hose put in its place without removal of the vacuum gauge 1 from the assembly 30. The isolation valve 38 can be opened and the system charged. After charging, the valve core 74 can be replaced in the manner described previously. The assembly 30 can be removed from the system.

The direct connections of the port 15 to the fitting 19 and fitting 43 to the body assembly 30, and the vacuum gauge 1 connection to the tool 31 by the fitting 15, 43 provides for accurate sensing of system pressure and reduces the likelihood of introducing leaks through the addition of further connections in the fluid path.

It is noted that the auxiliary conduit 36 can be mounted at a variety of angles from the main conduit 34. Traditionally where valve core removal tools have dual conduits, the primary conduit and the secondary conduit are at a 90° or 45° angle to one another. Surprisingly, it has been found that an acute angle of about 65° between the auxiliary conduit 36 and the main conduit 34 towards the service end 39a and the auxiliary end 45a is optimal to provide suitable access for items to be connected to the auxiliary conduit 36, such as the gauge 1 or a hose to a charging station or a vacuum pump, when used with a wide variety of refrigeration systems and to provide a suitable flow area at the junction between the auxiliary conduit 36 and the main conduit 34. This is particularly advantageous where the vacuum gauge is connected to the tool 31. It would also be advantageous, for example, where an alternate gauge such as for example a traditional analog display with numeric references or a gauge with digital display, not shown, is connected to a valve core removal tool having an auxiliary connection, without employing all of the details of features described herein, such as a vacuum gauge 1 with zones or a gripper 84. A digital display may decrease the cost of the gauge.

It is also noted that the auxiliary conduit 36 is smooth. It is possible to include internal threads for a valve, not shown, to allow closure of the auxiliary conduit 36 and switching of components to be attached to the auxiliary conduit while under pressure; however, this is not preferred as the threads and valve can interfere with fluid flow.

The vacuum gauge 1 can be integrated with the tool 31 by dispensing with the fitting 19, 43 and directly connecting to the isolation valve 21. Such direct connection may involve the use of welding, brazing, soldering, gluing or otherwise permanently sealing a threaded or non-threaded connection. The isolation valve 21 can be integrated with the auxiliary conduit 36, for example, in a manner similar to the isolation valve 38 in the main conduit 34. Increasing integration of the gauge 1 and the tool 31 can lessen the likelihood of introducing leaks from connections between the tool 31 and gauge 1. Also, care and storage of the integrated tool 31 and gauge 1 may be simplified. Integration may reduce potential uses for the tool 31 or gauge 1 or both the tool 31 and gauge 1 due to the increased size over the tool 31 and the gauge 1 independently.

Alternatively, in some circumstances it may be desirable to introduce a hose, not shown, between the tool 31 and gauge 1. For example, space requirements may be such that the gauge 1 cannot be directly connected to the tool 31 when in use.

It is recognized that not all of the aspects of the invention require the use of all of the features or of the particular embodiments described herein. The features can be combined as desired within the various aspects. Also, the features may be applied to other embodiments while remaining within the various aspects.

It will be understood by those skilled in the art that this description is made with reference to the preferred embodiment and that it is possible to make other embodiments employing the principles of the invention which fall within its spirit and scope as defined by the following claims.

What is claimed is:

1. A vacuum gauge for use in association with a refrigeration system, the gauge comprising:
   a) a scale having at least one pressure zone indicia selected from a group of zone indicia consisting of a safe zone indicia representing a range of pressure after which non-condensables have been effectively removed such that it is safe to charge the refrigeration system with refrigerant, and a working zone indicia representing a range of pressure within which water is being rapidly boiled off,
   b) an indicator to indicate a particular location on the scale, and
   c) a pressure sensing mechanism and housing having a pressure sensing port accessible for fluid connection to the refrigeration system to receive fluid for sensing, the pressure sensing mechanism and housing sensing pressure at the pressure sensing port and causing the indicator to move in accordance with sensed pressure at the pressure sensing port.

2. The gauge of claim 1 wherein the scale comprises, the working zone indicia and the safe zone indicia and the range of pressures represented by the working zone indicia and the safe zone indicia are contiguous with one another, and the indicia are distinctly coded for user differentiation.

3. The gauge of claim 2 wherein the safe zone indicia is green and the working zone indicia is blue.

4. The gauge of claim 1 wherein the scale further comprises a leak indicating zone indicia representing a range of pressures contiguous with the working zone indicia pressures that is useful for detecting leaks, and the leak indicating indicia is distinctly coded for user differentiation from the other indicia.

5. The gauge of claim 4 wherein the safe zone indicia is green, the working zone indicia is blue and the leaking indicating zone indicia is yellow.

6. The gauge of claim 1 wherein the scale further comprises a non-working zone indicia representing a range of pressures contiguous with the leak indicating zone indicia pressures wherein useful work is not occurring, and the non-working indicia is distinctly coded for user differentiation from the other indicia.

7. The gauge of claim 6 wherein the safe zone indicia is green, the working zone indicia is blue, the leaking indicating zone indicia is yellow and the non-working zone indicia is red.

8. The gauge of claim 1 further comprising an isolation valve to open and close fluid connection between the refrigeration system and the pressure sensing port.

9. The gauge of claim 1 further comprising a fitting for making an external connection to the gauge including fluid connection to the pressure sensing port.

10. The gauge of claim 1 wherein the at least one pressure zone indicia comprises a safe zone indicia representing a range of pressure from about 0 to 500 microns, and a working zone indicia representing a range of pressure from about 500 to 2000 microns.

11. The gauge of claim 10 wherein the at least pressure zone indicia further comprises a leak indicating zone indicia representing a range of pressure from about 2000 to 25,400 microns.

12. The gauge of claim 11 wherein the at least pressure zone indicia further comprises a non-working zone indicia representing a range of pressure from about 25,400 to 30,000 microns.

13. A service tool combination for use in association with a refrigeration system having a service fitting with a threaded valve core including a valve pin extending from the valve core, the combination comprising:
   a body assembly having a main conduit and opposing service fitting and system fitting at either end of the main conduit, and having an isolation valve between the service fitting and the system fitting such that the isolation valve has an open position permitting fluid communication through the main conduit between the service fitting and the system fitting, and a closed position preventing such fluid communication, and the isolation valve has a user accessible handle for actuation of the handle between the open position and the closed position, and the body assembly further having an auxiliary conduit extending at an angle from the main conduit between the system fitting and the isolation valve, and terminating in an auxiliary fitting,
   a shaft assembly having a shaft slidably and rotatably extending through a shaft nut, the shaft having a driver bit at one end for engaging the valve core of the refrigeration system and a gripper through which the pin extends and is retained, and wherein the shaft nut and service fitting form a releasable sealed connection such that the shaft assembly may be attached to or removed from the body assembly, and the shaft extends through the body assembly such that the driver bit can engage and rotate the valve core and the gripper can retain the valve pin when the system fitting of the body assembly is sealingly connected to a corresponding service fitting on the refrigeration system, and
   a vacuum gauge having a pressure sensing port in direct sealed connection with a fitting for releasable sealed fluid connection through the auxiliary fitting to the auxiliary conduit to receive fluid through the auxiliary conduit for pressure sensing.

14. The combination of claim 13 wherein the direct sealed connection between the pressure sensing port and the fitting as a rigid direct connection.

15. The combination claim 13 wherein the vacuum gauge is a vacuum gauge comprising:
   a) a scale having at least one pressure zone indicia selected from a group of zone indicia consisting of a safe zone indicia representing a range of pressure after which it is safe to charge the refrigeration system with refrigerant, and a working zone indicia representing a range of pressure within which water is being rapidly boiled off,
   b) an indicator to indicate a particular location on the scale, and
   c) a pressure sensing mechanism and housing having a pressure sensing port accessible for fluid connection to the refrigeration system to receive fluid for sensing, the pressure sensing mechanism and housing sensing pressure at the pressure sensing port and causing the indicator to move in accordance with sensed pressure at the pressure sensing port.

16. A method of servicing a refrigeration system, the method comprising:
   connecting a service tool combination including
      a body assembly having a main conduit and opposing service fitting and system fitting at either end of the main conduit, and having an isolation valve between the service fitting and the system fitting such that the isolation valve has an open position permitting fluid communication through the main conduit between the service fitting and the system fitting, and a closed position preventing such fluid communication, and the isolation valve has a user accessible handle for actuation of the handle between the open position and the closed position, and the body assembly further having an auxiliary conduit extending at an angle from the main conduit between the system fitting and the isolation valve, and terminating in an auxiliary fitting, a shaft assembly having a shaft slidably and rotatably extending through a shaft nut, the shaft having a driver bit at one end for engaging the valve core of the refrigeration system and a gripper through which the pin extends and is retained, and wherein the shaft nut and service fitting form a releasable sealed connection such that the shaft assembly may be attached to or removed from the body assembly, and the shaft extends through the body assembly such that the driver bit can engage and rotate the valve core and the gripper can retain the valve pin when the system fitting of the body assembly is sealingly connected to a corresponding service fitting on the refrigeration system, and a vacuum gauge having a pressure sensing port in direct sealed connection with a fitting for releasable sealed fluid connection through the auxiliary fitting to the auxiliary conduit to receive fluid through the auxiliary conduit for pressure sensing, at the system fitting to a service fitting of the refrigeration system and slidably extending the shaft assembly in the shaft nut with the isolation valve open to engage a valve core of the service fitting of the refrigeration system and retain a pin of the valve core, rotating the shaft such that the driver bit rotates and removes the valve core, slidably retracting the shaft assembly such that the valve core passes the isolation valve, closing the isolation valve, removing the shaft assembly from the body assembly, connecting a vacuum pump to the service port of the body assembly, opening the isolation valve, operating the vacuum pump to draw a vacuum through the service port of the body assembly, and sensing the pressure in the refrigeration system using the vacuum gauge to display sensed pressure.

17. The method of claim 16 wherein the vacuum gauge comprises:

a) a scale having at least one pressure zone indicia selected from a group of zone indicia consisting of a safe zone indicia representing a range of pressure after which it is safe to charge the refrigeration system with refrigerant, and a working zone indicia representing a range of pressure within which water is being rapidly boiled off, b) an indicator to indicate a particular location on the scale, and c) a pressure sensing mechanism and housing having a pressure sensing port accessible for fluid connection to the refrigeration system to receive fluid for sensing, the pressure sensing mechanism and housing sensing pressure at the pressure sensing port and causing the indicator to move in accordance with sensed pressure at the pressure sensing port.

18. The method of claim 17 wherein the vacuum gauge further comprises an isolation valve to open and close fluid connection between the refrigeration system and the pressure sensing port, and the vacuum gauge isolation valve is opened when pressure in the system is at or below atmospheric pressure.

* * * * *